F. G. VON HOORN

ELECTRIC SWITCH

July 15, 1930. Original Filed May 10, 1922 Re. 17,736

WITNESSES:

H. B. Funk.

A. Martin

INVENTOR

Fred G. Von Hoorn.

BY

Wesley G. Carr

ATTORNEY

Reissued July 15, 1930 Re. 17,736

UNITED STATES PATENT OFFICE

FRED G. VON HOORN, OF BRIDGEPORT, CONNECTICUT, ASSIGNOR TO WESTINGHOUSE ELECTRIC & MANUFACTURING COMPANY, A CORPORATION OF PENNSYLVANIA

ELECTRIC SWITCH

Original No. 1,582,711, dated April 27, 1926, Serial No. 559,708, filed May 10, 1922. Application for reissue filed April 26, 1928. Serial No. 273,119.

My invention relates to electric switches and particularly to operating mechanisms therefor.

One of the objects of my invention is the provision of manually operable means for closing a switch that is provided with an overload device, in such manner that, if an overload is present at the time the switch is moved to closed position, the switch may be automatically released regardless of the position of the manually operable member.

Another object of my invention is the provision of means whereby an actuating member for closing the switch is set in motion and then automatically freed from a manual operating member therefor, so that it may move to actuate the switch independently of the manually operable member.

Still another object of my invention is to simplify and improve generally the operation and construction of electric switches.

Figure 1:
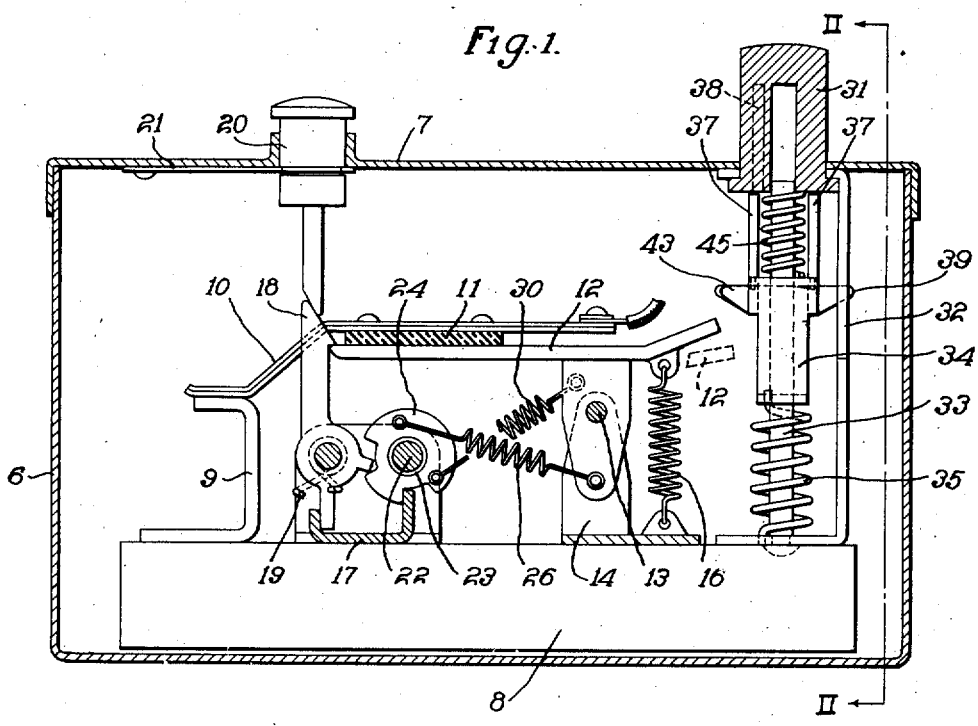
Figure 2:
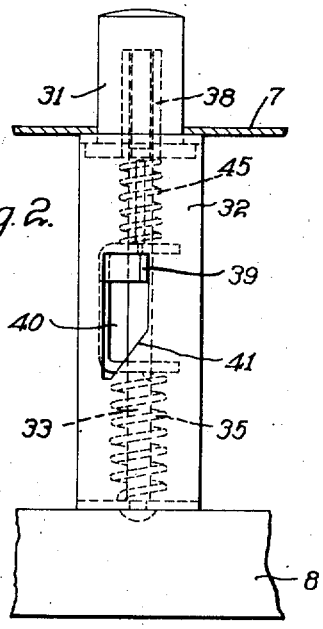
Figure 3:
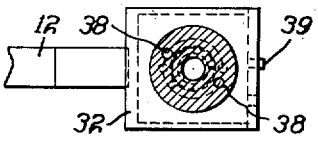
Figure 4:
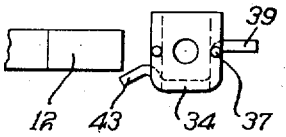
Figure 5:
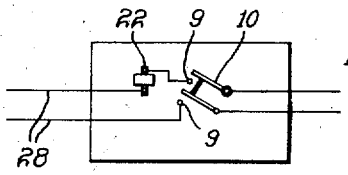

As shown in the accompanying drawings,

Figure 1 is a view, partially in side elevation and partially in section, of a switch embodying my invention, Fig. 2 is a view taken on the line II—II of Fig. 1, Fig. 3 is a view, partially in plan and partially in section, of a portion of the apparatus of Fig. 1, Fig. 4 is a plan view of still another portion of the apparatus, and Fig. 5 is a diagrammatic view showing the manner in which the switch of Fig. 1 is connected in a circuit.

The switch is mounted in a box 6 that is provided with a cover 7. A base 8 is provided to support a pair of stationary contact members 9 and a pair of movable contact members 10, the movable contact members being supported, through a plate 11 and a movable contact carrier 12 that is pivotally mounted at 13, upon a bracket 14 which is secured to the base 8. A spring 16 normally biases the movable switch parts in a clockwise direction. A bracket 17, that is secured to the base, pivotally supports a latch 18 that is biased about its pivot in a clockwise direction by a spring 19 and serves, through its engagement with the carrier 12, to hold the movable contact members in closed position against the tension of the spring 16.

A push button 20 is provided for manually tripping the latch 18 free of the contact carrier 12. A leaf spring 21 serves to normally hold the push button 20 in its retracted position.

The bracket 17 also serves as a support for a shaft 22 that is surrounded with fusible material or solder 23. The solder 23 serves to normally hold a tripping member 24 against turning movement under the action of a spring 26 that has its opposite ends secured to the member 24 and the carrier 12, respectively. The shaft 22 is of resistance material and in series with a circuit 28 that is controlled by the switch. Upon the occurrence of an overload in the circuit 28, the fusible material 23 is softened, thus permitting the tripping member 24 to turn in a clockwise direction, by reason of the tension exerted thereupon by the spring 26. This movement of the member 24 causes it to move the latch 18 against the tension of the spring 19 to trip it free of the carrier 12 and to thereby permit the spring 16 to snap the contact members 10 to open position.

As the switch moves to open position, the tension upon the spring 26 is decreased and that upon a spring 30 is increased, by reason of the movement of the carrier 12 about its pivot 13. This change in the tension exerted upon the member 24 moves such member in a counterclockwise direction until it again occupies the position illustrated in Fig. 1 and leaves it ready for another automatic operation, should an overload occur.

The features thus far described do not constitute essential parts of the present invention, but are set forth in order that the functional characteristics of my improvement may be clearly understood.

In order to manually close the switch, I provide the push-button 31 that is squared at its inner end to abut against a bracket 32 and thus be held against rotative movement.

The bracket 32 is secured to the base 8 and is provided with a pin 33 rigidly secured thereto. An actuating member or plunger 34 is slidable upon the rod 33 and is normally biased upwardly by a spring 35, the opposite ends of which are secured to the member 34 and the bracket 32, respectively.

The actuating member 34 is provided with a pair of upstanding pins 37 that are normally out of alinement with a pair of holes 38 in the push button 31.

Upon pressure of the button 31, the actuating member 34 is advanced against the compression of the spring 35 and, as it moves downwardly, a wing member 39, which extends through a slot 40 in the bracket 32, engages a camming surface 41 adjacent to the lower end of said slot.

A wing member 43 is also provided and so angularly disposed as to normally pass the rear end of the carrier 12 during its descent under the action of the push button 31. Immediately after the wing 43 passes the carrier 12, the wing 39 engages the camming surface 41, thus rotating the actuating member 34 in a clockwise direction and bringing the wing 43 into vertical alinement with the rear portion of the carrier 12. At this position of the bracket, the pins 37 are in alinement with the holes 38 of the push button and, owing to the compression of the spring 35, may snap into the holes 38, thus permitting the actuating member 34 to move upwardly under the pressure of the spring 35. If the carrier 12, at this time, occupies the position illustrated in dotted lines in Fig. 1, it will be moved to closed position against the tension of the spring 16.

This movement of the actuating member 34 may occur regardless of whether or not the operator holds the button 31 depressed. If, after upward movement of the member 34, the button 31 be released, it will be returned, under the action of a spring 45, to the position illustrated in Fig. 1, and the actuating member 34 will be rotated by reason of the torsion in the spring 35 until the pins 37 are again out of alinement with the holes 38.

It will thus be seen that, when the button 31 is depressed, the actuating member 39 is rotated so that it may move freely upward to close the switch, and that, should an overload be present in the circuit, the switch would be automatically moved to open position, regardless of whether the operator should maintain the button 31 depressed. In other words, the applicant provides a tripping device whereby it is impossible for the operator to hold the switch closed against automatic operation.

Various changes in detail and general arrangement may be made without departing from the spirit and scope of the invention, as defined in the accompanying claims.

I claim as my invention:

1. The combination with an electric switch normally biased to open position, of an actuating device therefor comprising a reciprocable actuating device, means for depressing the said device against a tension member, means for permitting the actuating device to pass the movable switch member while being compressed, and means for moving it into the path of the switch member after it has been placed under compression.

2. The combination with a movable switch member and an actuating device therefor provided with means for moving it into the path of the movable switch member when actuated in one direction and moving it out of the path of said switch member when operating in the other direction.

3. The combination with a movable switch member, of co-operating mechanism therefor comprising a push-button and an actuating member for the switch member movable independently of the push-button, the push-button and the actuating member being provided with means for automatically releasing the actuating member from the push button during one stage of its movement.

4. The combination with a movable switch member, of co-operating mechanism therefor comprising a push-button, an actuating member for the switch member movable independently of the push-button, the push-button and the actuating member being provided with means for automatically releasing the actuating member from the push-button during one stage of its movement and with means for again bringing them into operative relation at another stage of their movement.

5. The combination with a movable switch member, of operating mechanism therefor comprising a push-button, a plunger movable independently of the switch member, a spring for biasing the plunger against the button, a loose connection between the plunger and the button, means carried by the plunger for engaging the said switch member, and means for rendering the push-button inoperative to hold the plunger against tension at a predetermined stage in the movement of the plunger.

6. The combination with a movable switch member, of a tensioned actuating member therefor movable independently thereof, a push-button for operating the actuating member, and means for causing the actuating member to move independently of the push button when at a predetermined position.

7. The combination with a switch having an overload tripping device, of an actuating member for closing the switch, manually operable means for setting the actuating member in operation, and means for disconnecting the said manual means from the actuating member in advance of the movement by the said actuating member in one direction.

8. The combination with an electric switch, of a reciprocable actuating member therefor provided with a tension device, means carried by the actuating member for closing the switch when moving in one direction under the force of the tension device, a manually operable member for moving the actuating member against the tension device and means for disengaging the manually operable member from the actuating member at a predetermined position.

9. The combination with an electric switch, of a reciprocable actuating member therefor provided with a tension device, means carried by the actuating member for closing the switch when moving in one direction under the force of the tension device, a manually-operable member normally in operative engagement with the actuating member for moving it against the tension device, means for disengaging the manually operable member from the actuating member at a predetermined position and means for returning the said manual member to its normal position after it has been released.

10. In combination, a movable switch member, a manually operable member, an actuating member operable by the manually operable member in one direction independently of the switch and movable in the opposite direction independently of the manually operable member for actuating the switch during its return movement.

11. In combination, a movable switch member, a manually operable member, an actuating member operable by the manually operable member in one direction independently of the switch and automatically movable in the opposite direction independently of the manually operable member for actuating the switch during its return movement after the manually operable member has been moved a predetermined distance.

12. The combination with an automatically opened movable switch member, of a manually operated reclosing member therefor having a relatively movable switch actuating member adapted to move the switch to closed position independently of the manually operated member when the latter has moved a predetermined distance.

13. In a switch, the combination of a manually actuated means closing the switch, a member movable in response to current in the circuit controlled by the switch, a manually actuated mechanism operable independently of the said member for opening the switch, and devices controlled by the member for preventing the maintenance of a closed switch during an excess of current, said means being operative to close the switch with the same manual action following the opening of the switch by either the mechanism or the devices.

14. In a switch, the combination of a manually actuated means closing the switch, a member movable in response to current in the circuit controlled by the switch, a manually actuated mechanism operable independently of the said member for opening the switch and means controlled by the member for preventing the maintenance of a closed switch during an excess of current.

15. In a switch, the combination of a manually actuated means for closing the switch and permitting opening movement of the switch independently of the position of the operating means, a member movable in response to current in the circuit controlled by the switch, a manually actuated mechanism operable independently of the said member for opening the switch and means controlled by the member for preventing the maintenance of a closed switch during excess current.

16. In a switch, the combination of a manually actuated means closing the switch, a member movable in response to current in the circuits controlled by the switch, a manually actuated mechanism operable independently of the said member for opening the switch and means controlled by the member to open the switch on an excess of current notwithstanding the manual closing means be actuated to reset the switch to the closed position.

In testimony whereof, I have hereunto subscribed my name this 21st day of April, 1928.

FRED G. VON HOORN.